United States Patent [19]

Coale, deceased

[11] 4,102,954

[45] Jul. 25, 1978

[54] CASTING OF PPS FILM

[75] Inventor: Harold D. Coale, deceased, late of Bartlesville, Okla., by Geneva N. Coale, executrix

[73] Assignee: Phillips Petroleum Company, Bartlesville, Okla.

[21] Appl. No.: 782,461

[22] Filed: Mar. 29, 1977

[51] Int. Cl.² .............................................. B29C 1/04
[52] U.S. Cl. ...................................... 264/24; 264/216; 264/236; 264/331; 264/338; 528/388
[58] Field of Search ............... 264/331, 338, 337, 213, 264/212, 216, 24, 236; 260/79.1

[56] References Cited

U.S. PATENT DOCUMENTS

| | | | |
|---|---|---|---|
| 2,119,702 | 6/1938 | Carroll | 264/213 |
| 2,144,548 | 1/1939 | Safford | 264/213 |
| 3,032,815 | 5/1962 | Gerber | 264/213 |
| 3,354,129 | 11/1967 | Edmonds et al. | 260/79.1 |
| 3,629,388 | 12/1971 | Wolf et al. | 264/338 |
| 3,877,970 | 4/1975 | Edmonds et al. | 260/79.1 |
| 3,928,661 | 12/1975 | Higbee et al. | 264/331 |
| 3,930,061 | 12/1975 | Scharfenberger | 427/27 |

*Primary Examiner*—Jeffery R. Thurlow

[57] ABSTRACT

Films of poly(arylene sulfide) polymers are produced by applying a layer of an arylene sulfide polymer resin on a metal substrate, with a metal oxide release agent interposed between the substrate and the resin layer, curing the polymer thereon, cooling the polymer layer and removing the resulting film from the substrate.

9 Claims, No Drawings

CASTING OF PPS FILM

This invention relates to the production of sheets or films from polymeric materials. More particularly, this invention relates to the production of sheets or films from poly(arylene sulfide) materials.

Conventional methods of manufacturing film have not generally been successful when applied to poly(arylene sulfide) resins. Sheet material can be made by extrusion using a poly(arylene sulfide) resin having a high melt flow. Film, however, is more difficult to produce, particularly, film of substantially uniform thickness.

It has been proposed to produce poly(arylene sulfide) film and sheet by casting the resin onto a metal substrate, curing the deposited material and removing the cured film. One serious problem in producing sheets or films of such resin in this manner is the known property of such resin to form strongly adhering bonds to metal substrates.

Accordingly, it is an object of the present invention to provide a process for producing arylene sulfide polymer film and sheet material.

Other objects, aspects and advantages of the present invention will be apparent to those skilled in the art from a reading of the following detailed description and the appended claims.

In accordance with the present invention there is provided a process for producing film and sheet material of a poly(arylene sulfide) resin which comprises applying a metal oxide release agent to a metal substrate, applying a layer of a poly(arylene sulfide) resin over the release agent, curing the resin and removing the resulting film or sheet material from the metal substrate.

The term "poly(arylene sulfide)" as used herein and in the claims is intended to include normally solid arylene sulfide polymers of the type disclosed in U.S. Pat. No. 3,354,129, issued Nov. 21, 1967, to Edmonds and Hill. As disclosed in this patent, these polymers can be prepared by reacting a polyhalo-substituted cyclic compound containing unsaturation between adjacent ring atoms, and an alkali metal sulfide in a polar organic compound. The resulting polymer contains the cyclic structure of the polyhalo-substituted compound coupled in repeating units through a sulfur atom. The polymers which are preferred for use in the process of this invention, because of their high thermal stability and availability of materials from which they are prepared, are those polymers having the repeating unit —R—S— where R is phenylene, biphenylene, naphthylene, biphenylene ether or a lower alkyl-substituted derivative thereof. By "lower alkyl" is meant alkyl groups having 1 to 6 carbon atoms such as methyl, ethyl, propyl, isopropyl, n-hexyl and the like.

The polymers which are used in this invention are preferably those which have melting temperatures above about 400° F (204° C). These arylene sulfide polymers can have melting temperatures in the range of 400° to 900° F (204° to 482° C). Polymers of phenylene sulfide normally have melting temperatures in the range of about 550° to 900° F (288° to 482° C). The preferred polymers have an inherent viscosity in chloronaphthalene at 206° C of at least 0.1, preferably between 0.1 and 0.3, more preferably between 0.13 and 0.23. A particularly preferred polymer is poly(phenylene sulfide) (PPS), having a melt flow of 50 to above 2500 (limit of instrument measurement) by ASTM 1238-65T, Condition B at 343° C (weight in grams in 10 minutes under a 5 kilogram load at 343° C). The virgin PPS which has a melt flow of above 2500 can be precured by heating in air at 500°–520° F (260°–271° C) for 1–6 hours to lower the melt flow.

As used herein and in the claims, the term "film" is intended to mean a material having a thickness of less than about 10 mils, and the term "sheet" is intended to mean a material having a thickness of greater than about 10 mils.

As described previously, a layer of the poly(arylene sulfide) resin is applied to the release agent-coated substrate, then cured. Curing of the resin is accomplished by heating at a temperature in the range of 650° to 750° F (343° to 399° C) for a period ranging from ¼ to 2 hours. During this time the resin particles coalesce into a smooth continuous film. After curing, the coated metal is cooled. The polymeric film can then be readily stripped from the metal surface. A metal oxide is interposed between the metal substrate and the poly(arylene sulfide) resin layer as a release agent. Copper oxide and iron oxide are preferred for use as release agents because of their ready availability.

The metal substrate can be any metal having sufficient integrity to maintain its dimensions during the polymer curing step. The dimensions of the metal substrate are not critical. Generally, the metal substrate will have a thickness in the range of 1/64 to 1 inch.

The metal oxide release agent can be applied to the metal substrate in any convenient manner, such as by dusting, spraying or otherwise spreading the metal oxide uniformly over the surface of the metal substrate.

The poly(arylene sulfide) resin is applied to the release agent-coated substrate by any means known in the art, such as by spray coating, slurry coating or the like, in one or more applications to provide a total thickness of from 0.5 to 10 mils, preferably about 2.5 to 7 mils. If more than one layer of the resin coating is desired, each intermediate layer is partially cured before application of the next layer. In a presently preferred embodiment the resin coating is applied to the release agent-coated substrate using an electrostatic spray apparatus.

The process of this invention can be carried out as a batch- or continuous-type operation. For making the poly(arylene sulfide) film in continuous fashion, the substrate is made in the form of a continuous belt. The iron oxide or copper oxide release agent is applied first to the moving belt, after which the poly(arylene sulfide) resin is applied. The belt then passes through an oven wherein the resin coating is cured. The material emerging from the oven is cooled and then stripped from the moving belt.

Poly(arylene sulfide) film prepared according to the present invention can be used for laminating applications and for preparing flexible printed circuit material.

Reasonable variations and modifications, which will be apparent to those skilled in the art, can be made in this invention without departing from the spirit and scope thereof.

What is claimed is:

1. A process for producing a poly(arylene sulfide) film comprising the steps of:
   (a) applying a metal oxide release agent consisting essentially of at least one member of the group consisting of copper oxide and iron oxide to a metal substrate;
   (b) applying a layer of a poly(arylene sulfide) resin over said release agent;

(c) curing said poly(arylene sulfide) resin; and (d) removing the resulting poly(arylene sulfide) film from said substrate.

2. The process of claim 1 wherein said release agent is copper oxide.

3. The process of claim 1 wherein said release agent is iron oxide.

4. The process of claim 1 wherein said resin has a melt flow in the approximate range of 50 to 2500.

5. The process of claim 1 wherein said resin is poly(phenylene sulfide).

6. The process of claim 1 wherein said resin is cured by heating to a temperature in the approximate range of 650° to 750° F.

7. The process of claim 1 wherein said resin layer is applied electrostatically.

8. The process of claim 1 wherein said resin layer has a thickness in the approximate range of 0.5 to 10 mils.

9. The process of claim 1 wherein said release agent is applied to a moving belt of said metal substrate, said poly(arylene sulfide) resin is applied over said release agent and thereafter said resin is cured prior to removing the resulting poly(arylene sulfide) film from said belt.

* * * * *